US007065716B1

(12) United States Patent
Rzepkowski et al.

(10) Patent No.: US 7,065,716 B1
(45) Date of Patent: Jun. 20, 2006

(54) SYSTEMS, METHODS AND GRAPHICAL USER INTERFACES FOR PREVIEWING IMAGE CAPTURE DEVICE OUTPUT RESULTS

(75) Inventors: Kristinn R. Rzepkowski, Rochester, NY (US); Rudolph A. Rodrigues, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,274

(22) Filed: Jan. 19, 2000

(51) Int. Cl.
*G06F 3/00* (2006.01)
*G06F 15/16* (2006.01)

(52) U.S. Cl. .................. 715/839; 715/781; 715/835; 715/838; 715/526; 715/527; 358/442; 358/474

(58) Field of Classification Search ............... 715/517, 715/520, 521, 526, 527, 530, 764, 771, 772, 715/773, 781, 835, 838, 839, 846; 358/401, 358/442, 443, 448, 451–453, 468, 474
See application file for complete search history.

(56) References Cited

U.S. PATENT DOCUMENTS

| 4,837,635 | A | * | 6/1989 | Santos ........................ 358/401 |
| 5,260,805 | A | * | 11/1993 | Barrett ........................ 358/449 |
| 5,301,036 | A | * | 4/1994 | Barrett et al. ................ 358/448 |
| 5,502,577 | A | * | 3/1996 | Mackinlay et al. .......... 358/468 |
| 5,596,346 | A | * | 1/1997 | Leone et al. ................ 345/667 |
| 5,953,007 | A | * | 9/1999 | Center et al. ................ 715/764 |
| 5,963,216 | A | * | 10/1999 | Chiarabini et al. ......... 345/660 |
| 6,078,936 | A | * | 6/2000 | Martin et al. ................ 345/3.1 |
| 6,128,013 | A | * | 10/2000 | Prabhu et al. ............... 345/707 |
| 6,157,439 | A | * | 12/2000 | Rousseau et al. ............. 355/61 |
| 6,222,545 | B1 | * | 4/2001 | Suzuki et al. ............... 345/418 |
| 6,249,361 | B1 | * | 6/2001 | Tahara ........................ 358/1.13 |

(Continued)

*Primary Examiner*—X. L. Bautista
(74) *Attorney, Agent, or Firm*—Oliff & Berridge, PLC

(57) ABSTRACT

The user enters the desired image capture parameters to be used when capturing an electronic image of an original document into one or more portions of a preview graphical user interface. Then, either automatically, or upon selecting a preview function, a preview pane portion of the preview graphical user interface is generated. The preview pane portion graphically illustrates how the various image capture parameters selected by the user will be applied to the original document to generate the captured electronic image data. Each of the different types of image capture parameters has a different visual cue associated with it. The visual cues visually inform the user of the image capture parameters that the user has selected. Thus, without actually capturing a preview image and without filling the preview pane portion with an actual preview image, the user can accurately determine what the resulting image will look like after the original document is captured. Thus, most preview scans can be eliminated. The user can also easily determine whether a preview scan is required. For example, a preview scan may still be desirable if it is difficult for the user to determine if the selected image capture parameters will result in the desired captured electronic image data. However, even if the user determines that a preview scan is still desirable, the selected image capture parameters will generally be closer to the required image capture parameters before the actual preview scan is generated than without using the preview graphical user interface.

45 Claims, 10 Drawing Sheets

U.S. PATENT DOCUMENTS

| | | |
|---|---|---|
| 6,281,983 B1 * | 8/2001 | Takahashi et al. ............ 358/1.2 |
| 6,298,172 B1 * | 10/2001 | Arney et al. ................. 382/293 |
| 6,317,141 B1 * | 11/2001 | Pavley et al. ................ 345/723 |
| 6,330,085 B1 * | 12/2001 | Yamamoto et al. .......... 358/448 |
| 6,362,901 B1 * | 3/2002 | Passman et al. ............ 358/453 |
| 6,452,607 B1 * | 9/2002 | Livingston ................... 715/705 |
| 6,466,302 B1 * | 10/2002 | Rousseau et al. ............. 355/61 |
| 6,505,252 B1 * | 1/2003 | Nagasaka .................... 709/232 |
| 6,519,049 B1 * | 2/2003 | Nagasaka ................... 358/1.15 |
| 6,731,309 B1 * | 5/2004 | Unbedacht et al. ......... 715/765 |

* cited by examiner

SYSTEMS, METHODS AND GRAPHICAL USER INTERFACES FOR PREVIEWING IMAGE CAPTURE DEVICE OUTPUT RESULTS

BACKGROUND OF THE INVENTION

1. Field of Invention

This invention is directed to a graphical user interface for an image capture device, such as a scanner.

2. Description of Related Art

Scanners and other types of image capture devices have become ubiquitous office productivity tools for generating electronic images of physical original documents. Once an electronic image of a physical original document has been generated, the electronic image data can be used in an infinite variety of ways to increase the productivity and the product quality of an office. Such image capture devices include desktop scanners, other stand-alone scanners, digital still cameras, digital video cameras, the scanning input portions of digital copiers, facsimile machines and other multi-function devices that are capable of generating electronic image data from an original document, and the like. These image capture devices can also include image databases that store previously captured electronic image data.

However, as the cost of scanners and other image capture devices has dropped and the output quality of the captured electronic image data has improved, scanners and other image capture devices have been provided with an ever-increasing number of controllable features. Similarly, as users have become comfortable with capturing and using electronic image data obtained from original documents, the uses to which the electronic image data has been put, and thus the needed control over the quality and appearance of the electronic image data, have expanded greatly.

In response, standard interfaces between such image capture devices, including those indicated above, and the various application programs that use such captured electronic image data have been developed. These standard interfaces allow standard-compliant image capture devices and standard-compliant applications to easily communicate. One exemplary embodiment of such a standard interface is the TWAIN™ interface. The TWAIN™ interface allows any TWAIN™-compliant application program to input and use electronic image data using any TWAIN™-compliant image capture device.

SUMMARY OF THE INVENTION

The TWAIN™-compliant component protocol facilitates communication between application programs and image capture devices, such as those indicated above. One such TWAIN™ image capture device is the XEROX® DigiPath™ scanner.

The ever-increasing numbers of features provided by image capturing devices such as the Xerox®DigiPath™ scanner cause users of these image capturing devices to find it increasingly difficult to obtain the desired scanning results without generating a preview scan. A preview scan is a scan of a document on a platen of the image capture devices that is generated when the user requests a preview of the actual image. For example, the preview image can be generated by driving a scan bar of a scanner to generate a low resolution image of the document.

The preview image allows the operator to confirm, among other things, whether the original document has been fed correctly into the scanner to obtain the desired orientation of the resulting image, whether the desired cropping or framing of the input image has been correctly defined, whether the desired scaling of the input image has been correctly defined, whether the proper image type has been selected to select the appropriate scanning parameters, and the like.

However, generating a preview scan takes time that could otherwise be used to generate actual production scans. Thus, users often do not wish to generate a preview scan prior to generating a production scan of the original document due to reduced productivity that the preview scan causes. However, if the production operator does not generate a preview scan, it is often difficult to determine exactly how the resulting electronic image will appear. Moreover, generating a second production scan, because the scanned image did not correspond to the desired scanned image, often takes more time than generating the preview scan would have taken. Thus, generating a production scan that does not correspond to the desired electronic image reduces the operator's productivity beyond that cause by generating a preview scan. Moreover, even determining whether a preview scan should be performed, rather than performing a preview scan automatically, can be complex and time consuming.

This invention thus provides systems, methods and graphical user interfaces that allow the user to visualize the results of generating a production scan of an original document using the current scan parameters without generating a preview scan.

This invention separately provides systems, methods and graphical user interfaces that allow an operator to determine, without generating a preview scan, if the original document will be fed correctly into the image capture device and if the captured image will have the desired orientation.

This invention separately provides systems, methods and graphical user interfaces that allow a user to determine, without generating a preview scan, whether the current image capture parameters will crop or frame the desired portion of the original document.

This invention separately provides systems, methods and graphical user interfaces that allow a user to easily determine, without generating a preview scan, whether the captured portion of the original document will be scaled as desired.

This invention separately provides systems, methods and graphical user interfaces that allow the user to determine, without generating a preview scan, whether the current image type parameters correspond to the desired image type parameter.

This invention separately provides one or more graphical user interfaces that graphically illustrate how the current image capture parameters will be applied to the document to be scanned.

In various exemplary embodiments of the systems, methods and graphical user interfaces of this invention, the user enters the desired image capture parameters to be used when capturing an electronic image of an original document into one or more portions of one or more graphical user interfaces. Then, either automatically, or upon selecting a preview function, a preview pane portion of the graphical user interface is generated. The preview pane portion graphically illustrates how the various image capture parameters selected by the user will be applied to the original document to generate the captured electronic image data.

In particular, in various exemplary embodiments, various ones of the different types of image capture parameters has a different visual cue associated with it. The visual cues visually inform the user of the image capture parameters that the user has selected. Thus, without actually capturing a preview image and without filling the preview pane portion with an actual preview image, the user can accurately determine what the resulting image will look like after the original document is captured. Thus, most preview scans can be eliminated.

Moreover, the user can quickly determine whether a preview scan is required or not. For example, a preview scan may still be desirable if it is difficult for the user to determine if the selected image capture parameters will result in the desired captured electronic image data. However, even if the user determines that a preview scan is still desirable, the systems, methods and graphical user interfaces according to this invention will still be useful, in that the selected image capture parameters are likely to be closer to the required image capture parameters before the actual preview scan is generated than without using the systems, methods and graphical user interfaces of this invention.

These and other features and advantages of this invention are described in or are apparent from the following detailed description of various embodiments of the systems, methods and graphical user interfaces according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
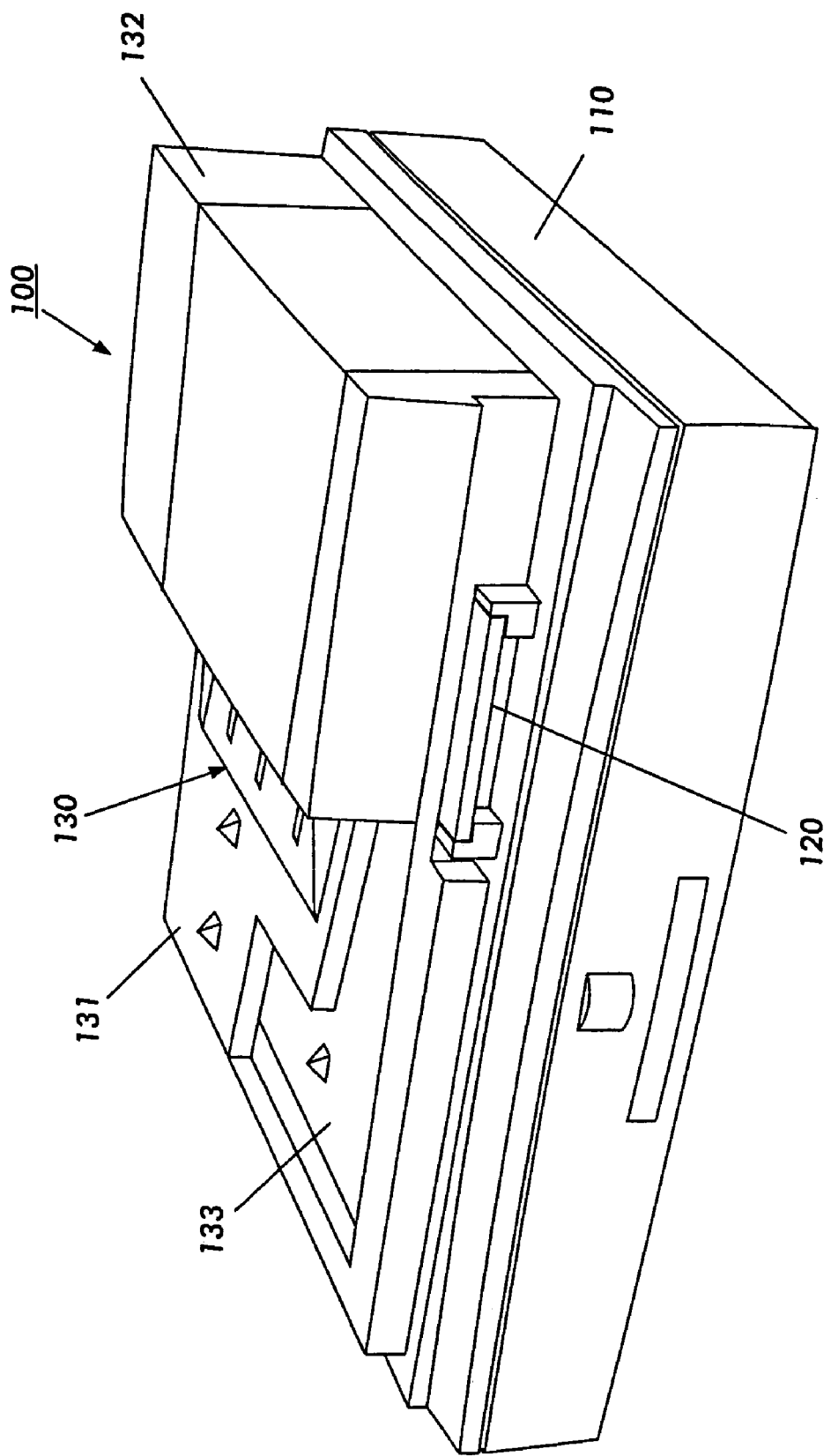
FIG. 1 is a perspective drawing of an exemplary electronic image generating device.

FIG. 1 illustrates a first exemplary embodiment of an electronic image data capturing device 100 usable with the image previewing systems, methods and graphical user interfaces of this invention. As shown in FIG. 1, the electronic image data capture device 100 includes a control panel 110, a document platen 120 on which an original document can be placed to generate corresponding electronic image data and a document handler 130. In particular, the document handler 130 includes a feed tray 131 on which the original document can be placed and a document feeder 132 which moves each document in turn from the feed tray 131 and feeds the removed document to the document platen 120. Each document is then returned to an output tray 133 after electronic image data is generated from that original document.

It should be appreciated that the electronic image data capture device can also be referred to as variously, a scanner, an image capture device, an electronic image data generating device, or the like, and, regardless of the name, can be any one of a stand-alone scanner, a digital copier, a facsimile machine, a multi-function device, a digital still camera, a digital video camera, an electronic image database storing previously generated electronic image data, or any other known or later device that is capable of generating (or supplying) electronic image data from an original document.

Figure 2:
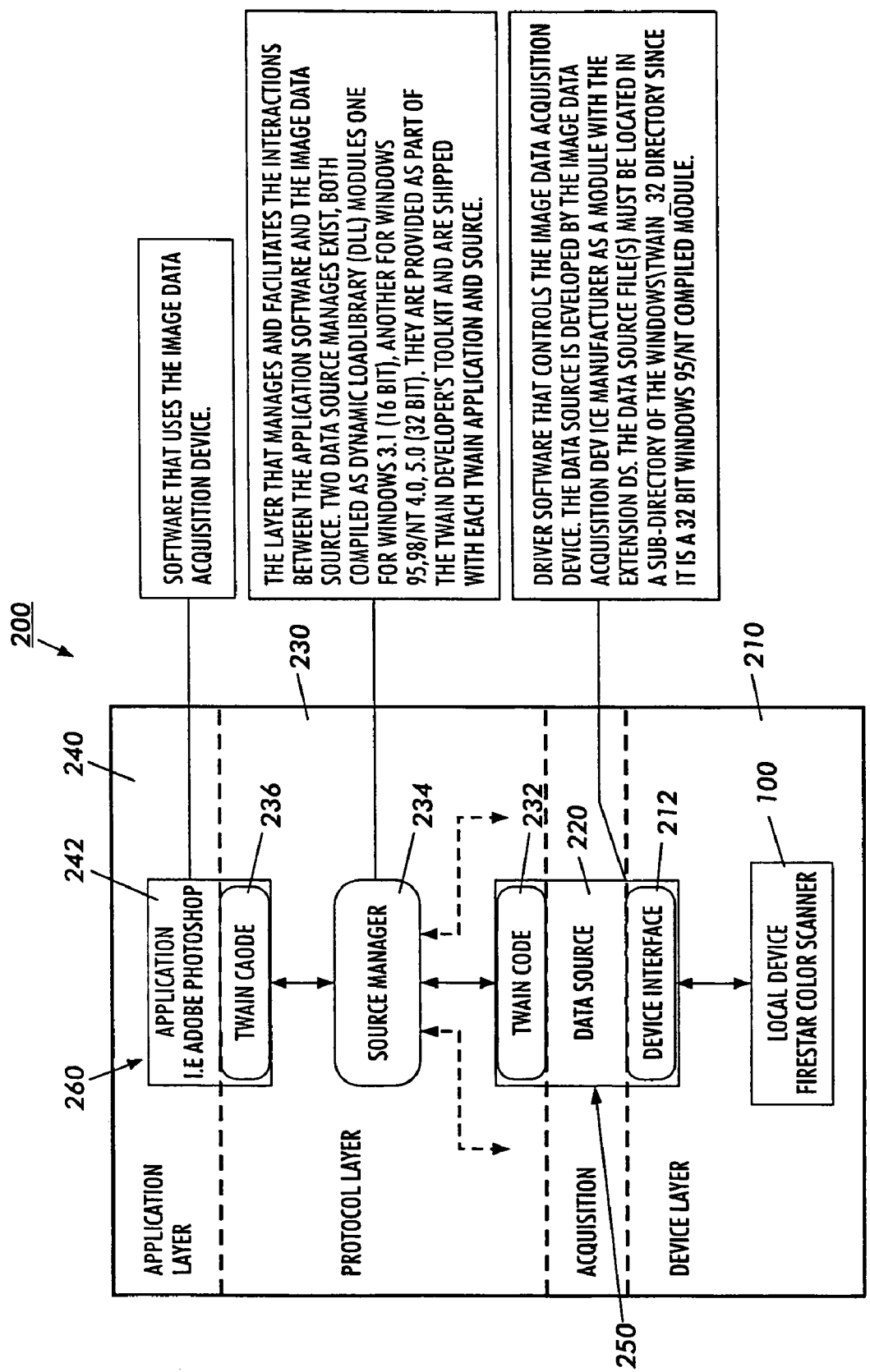
FIG. 2 is a block diagram illustrating a first exemplary embodiment of the structure of an image capture device control system that incorporates the various exemplary embodiments of the image previewing systems, methods and graphical user interfaces of this invention.

FIG. 2 is a block diagram illustrating a first exemplary embodiment of the structural organization of an image capture device control system 200 that incorporates the image previewing systems, methods and graphical user interfaces according to this invention. As shown in FIG. 2, the image capture device control system 200 includes a device layer 210, an acquisition layer 220, a protocol layer 230, and an application layer 240. In particular, the device layer 210 includes the image capture device 100, such as a Xerox® DigiPath™ color scanner or any of the other electronic image data capture devices indicated above. The device layer 210 also includes a device interface portion 212 of a TWAIN™ driver, or TWAIN™ data source, 250. In particular, as shown in FIG. 2, the TWAIN™ driver (or data source) 250 bridges the device layer 210, the acquisition layer 220 and the protocol layer 230.

The protocol layer 230 includes a TWAIN™ code portion 232 of the TWAIN™ driver (or data source) 250, a source manager 234 and a TWAIN™ code portion 236 of a TWAIN™-compliant application 260. The application layer 240 includes the application portion 242 of the application 260.

As shown in FIG. 2, control and data signals are provided from the electronic image data capture device 100 to the TWAIN™ driver (or data source) 250 through the device interface portion 212 of the TWAIN™ driver (or data source) 250. Similarly, control and data signals between the TWAIN™ driver (or data source) 250 and the source manager through the TWAIN™ code portion 232 of the TWAIN™ driver (or data source) 250. The control and/or data signals are also provided between the source manager 234 and the application 260 through the TWAIN™ code portion 236. In various exemplary embodiments, the TWAIN™ driver (or data source) 250 controls the electronic image data capture device 100. In various ones of these exemplary embodiments, the TWAIN™ driver or data source 250 is developed by the manufacturer of the electronic image data capture device 100.

The source manager 234 manages and facilitates the interactions between the application 260 and the TWAIN™ driver or data source 250. In various exemplary embodiments, one or more of two distinct source managers 234 have been implemented. Both are compiled as dynamic loading library modules. One exemplary dynamic load library implementation of the source manager 234 is a 16-bit program developed for, for example, Microsoft® Windows® 3.1. The other dynamic load library implementation of the source manager 234 is a 32-bit program developed for Windows® 95/98 and Windows® NT 4.0/5.0. In general, these two dynamic load library modules are provided as part of the TWAIN™ developers tool kit and are shipped with each TWAIN™-compliant application and at each TWAIN™-compliant electronic image data generating device.

Figure 3:
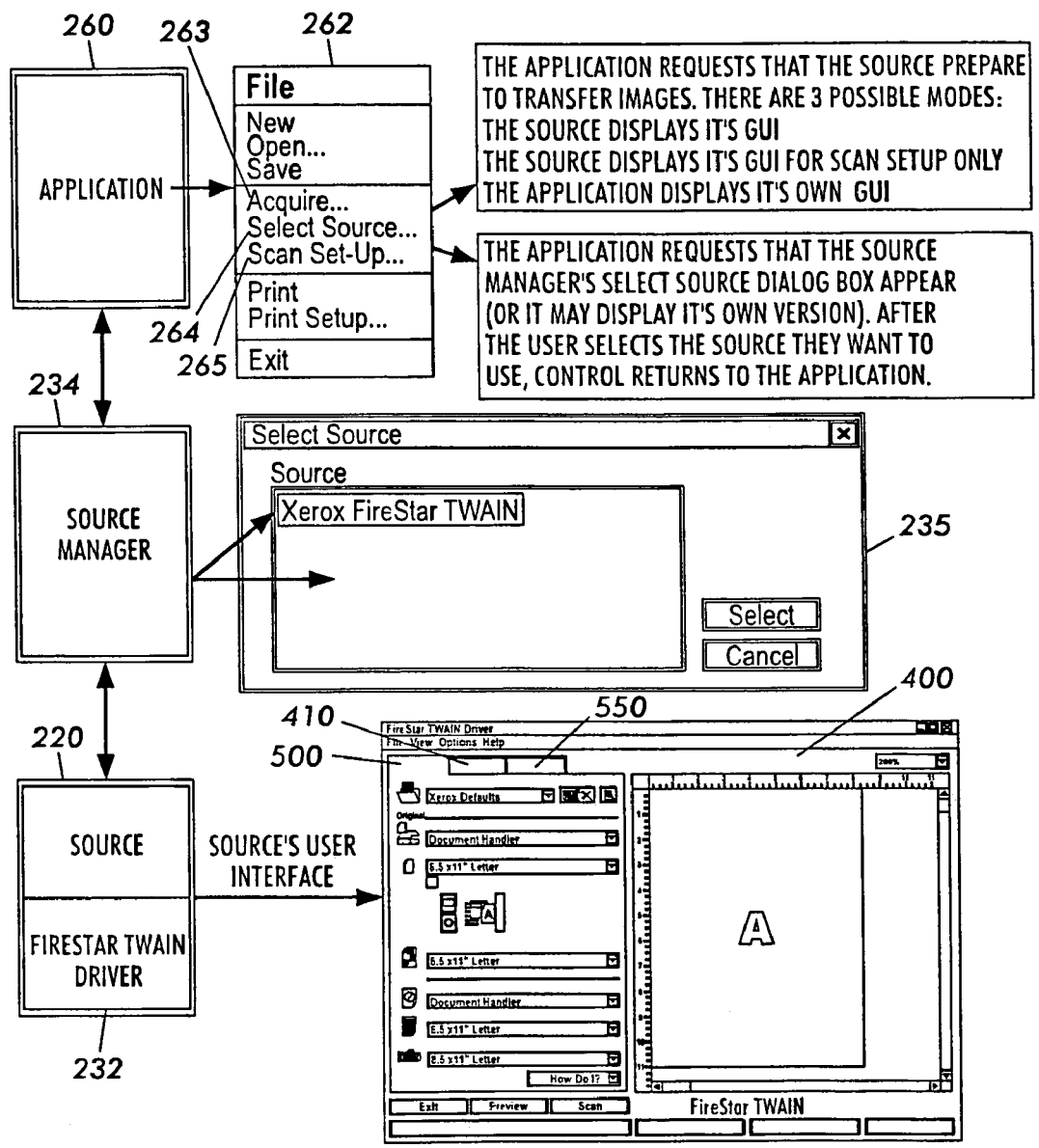
FIG. 3 is a second exemplary embodiment of an image capture and usage system that incorporates the systems and methods of this invention.

FIG. 3 illustrates one exemplary embodiment for accessing the systems, methods and graphical user interfaces according to this invention. As shown in FIG. 3, a FILE menu 262 of a TWAIN™ compliant application 260 will include a plurality of menu items that provide an interface to a TWAIN™ compliant electronic image data capture device 100, such as a TWAIN™-compliant scanner. These menu items include various ones of at least an Acquire menu item 263, a Select Source menu item 264 or a Scan Set-Up menu item 265.

As shown in FIG. 3, selecting the Acquire menu item 263 causes the application 260 to request that the electronic image data capture device 100 prepare to capture electronic image data from an original document and/or transfer capture electronic image data to the image capture device control system. In particular, in response to the selecting the Acquire menu item 263, the application 260 can display its own graphical user interface. Alternatively, the TWAIN™ driver (or data source) 250 for the selected electronic image data capture device can display one of its graphical user interfaces. Finally, if the Scan Set up menu item 265 was selected, the TWAIN™ driver (or data source) 250 can display a specific Scanner Set-Up graphical user interface.

In particular, as shown in FIG. 3, when any of the menu items 263–265 are selected, the application 260 calls the source manager 234. In response, the source manager accesses each TWAIN™ driver (or data source) 250 that is present in the image capture device control system 200. The source manager 234 then displays, in a graphical user interface 235, all of the different TWAIN™ drivers (or data sources) 250 present on the image capture device control system 200. Once the user selects the particular TWAIN™ driver (or data source) 250 that the user wishes to use, the TWAIN™ driver (or data source) 250 will display a graphical user interface 400 that allows the user to select various ones of the image capture parameters and scanning control functions implemented in that TWAIN™ driver (or data source) 250.

Figure 4:
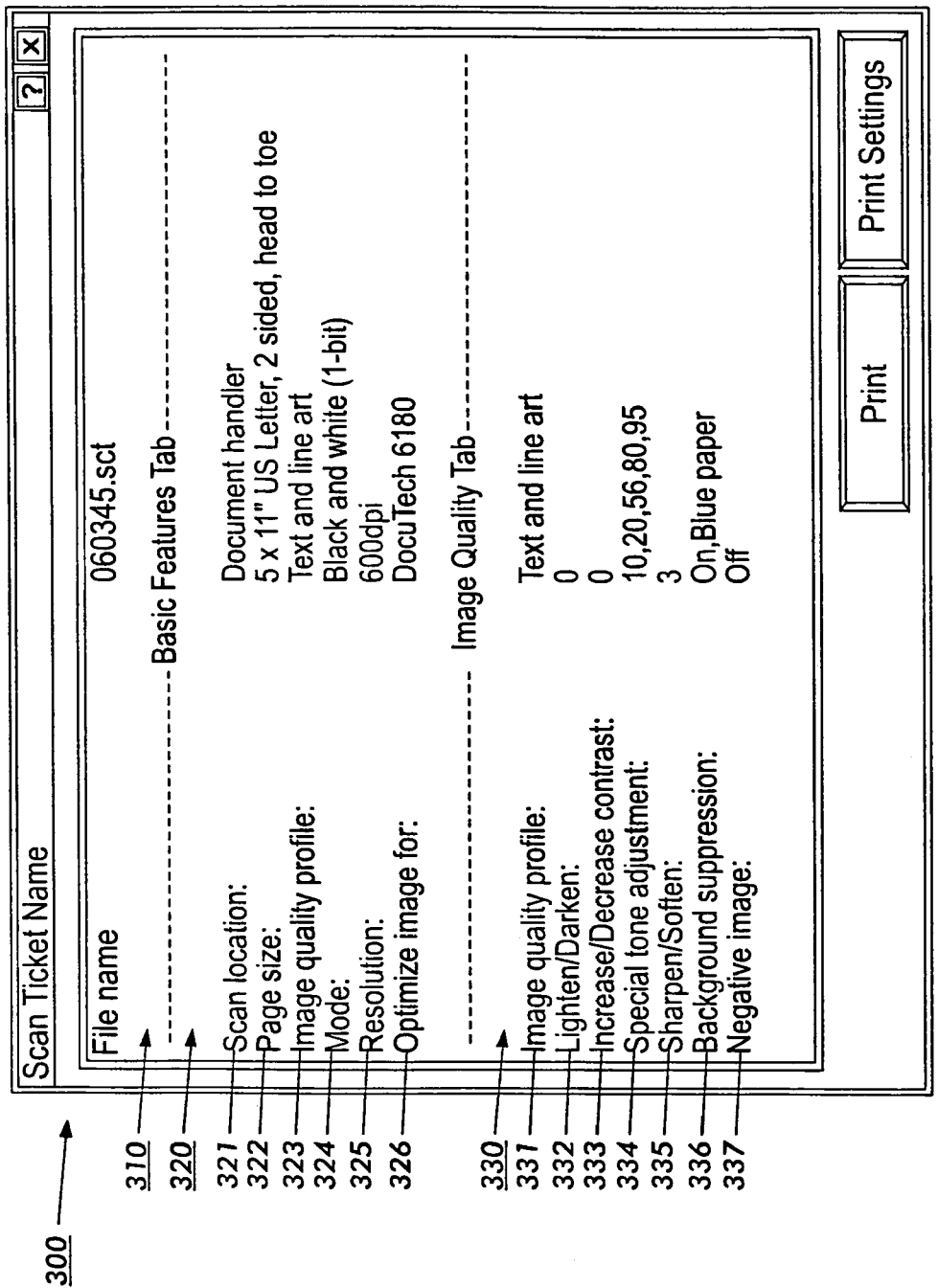
FIG. 4 is an exemplary embodiment of a scan ticket illustrating various image scanning parameters according to this invention.

FIG. 4 illustrates one exemplary embodiment of a scan ticket 300. Scan tickets contain all of the settings in the TWAIN™ graphical user interface 400, which is discussed in greater detail below. In general, there will be a set of one or more sets of saved scan parameters, or "scan tickets" for each language supported the TWAIN™ driver (or data source) 250 according to this invention. When the TWAIN™ graphical user interface 400 is displayed, only those sets of saved scan parameters, or "scan tickets" for the language the user is currently operating in are displayed. When a set of saved scan parameters, i.e., a "scan ticket", is selected, all the settings contained within that scan ticket are used to populate the TWAIN™ graphical user interface 400 according to this invention.

As shown in FIG. 4, a scan ticket 300 includes at least a file name portion 310, a basic features portion 320, an image quality portion 330 and an image size portion (not shown). The basic features portion 320 corresponds to the basic features tab 500 of the TWAIN™ graphical user interface 400 shown in FIG. 3. Similarly, the image quality portion 330 and the image size portion correspond to the image quality tab 410 and the image size tab 550, respectively, of the graphical user interface 400 shown in FIG. 3. The image quality 410 is described in greater detail in U.S. patent application Ser. No. 09/487,271, filed Jan. 19, 2000, and incorporated herein by reference in its entirety.

As shown in FIG. 4, the basic features portion 320 includes a scan location parameter 321, an input original document size parameter 322, an original image quality profile parameter 323, a mode parameter 324, a resolution parameter 325, and image optimization parameter 326. The image quality portion 330 includes an image quality profile parameter 331, a brightness parameter 332, an increase/decrease contrast parameter 333, a special tone adjustments parameter 334, a sharpen/soften parameter 335, a background suppression parameter 336 and a negative image parameter 337.

In particular, the scan location parameter 321 indicates the particular electronic image capture device that is to be used to capture electronic image data from a particular original document. The page size parameter 322 indicates the size of the input document, whether the input document is single-sided or double-sided, and, if the original document is double-sided, how the two images on each side of the original document are oriented relative to each other. The original image quality profile parameter 323 indicates image characteristics of and enhancements to be applied to the original document when it is made into its electronic form. Image quality profiles are described in greater detail in U.S. patent application Ser. No. 09/487,269, filed Jan. 19, 2000, and incorporated herein by reference in its entirety. The mode parameter 324 indicates the particular image capture mode to be used. For example, the image of the original document could be captured as a binary bitmap image, as shown in FIG. 4 or, as an 8-bit grayscale image, or as a color image having various color spaces and bit depths.

The resolution parameter 325 indicates the resolution of the generated electronic image data. The image optimization parameter 326 indicates a particular output device, such as a particular laser printer, a particular ink jet printer, a particular digital copier, or the like, that will be used to generate hard copies of the generated electronic image data and thus for which the electronic image data should be optimized for when the electronic image data of the original document is captured.

The image quality profile parameter 331 of the image quality portion 330 is the same as the image quality profile parameter 323. The lighten/darken parameter 332 indicates whether the electronic image data is to be lighter or darker than the images on the original document. Similarly, the increase/decrease contrast parameter portion 333 indicates whether the contrast of the electronic image data is to be greater or less than the contrast of the images on the original document. The special tone adjustment parameter 334 is used to provide finer control over the tone reproduction curve that is used to convert the continuous tone image values of the original document to the multi-bit-depth image values of the generated electronic image data. This is described in greater detail in the incorporated 271 application.

The sharpen/soften parameter portion 335 is used to indicate whether the edges within the images in the original document should be sharpened or softened in the generated electronic image data. The background suppression parameter 336 is used to indicate whether background suppression should be used, and if so, the color or other quality of the background of the original document that is to be suppressed. The negative image parameter 337 indicates whether the generated electronic image data should be a negative image relative to the images on the original document. Various other ones of the particular scanning parameters discussed above are further disclosed in U.S. patent application Ser. Nos. 09/487,273, 09/487,272 and 09/487, 266, each filed on Jan. 19, 2000, and each incorporated herein by reference in its entirety.

Figure 5:
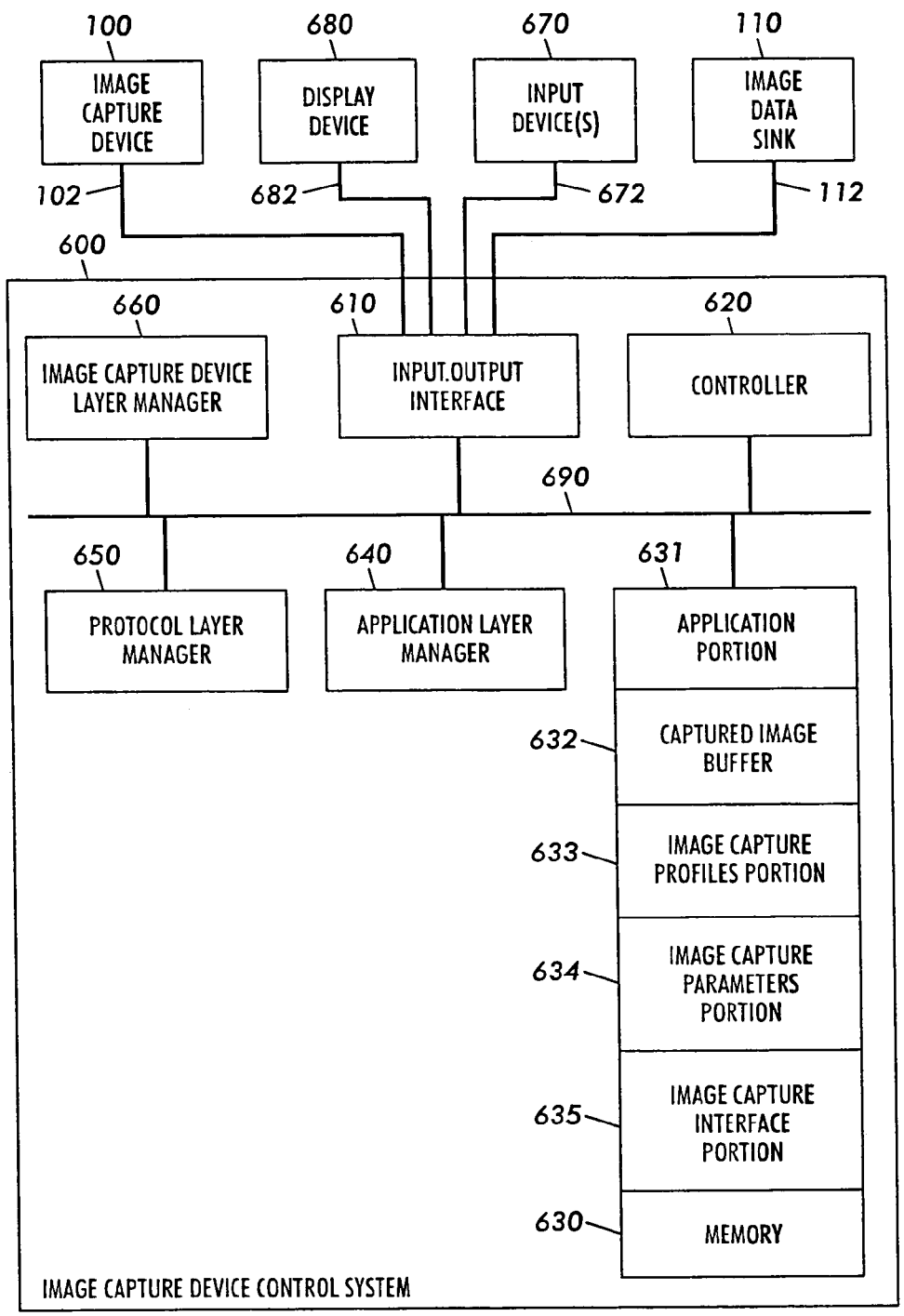
FIG. 5 is a block diagram of a second exemplary embodiment of the image capture control system that incorporates the image previewing systems, methods and graphical user interfaces of this invention.

FIG. 5 is a block diagram illustrating a second exemplary embodiment of the structural organization of an image capture device control system 600 that incorporates the image previewing systems methods and graphical user interfaces according to this invention. As shown in FIG. 5, the image capture device control system 600 includes an input/output interface 610, a controller 620, a memory 630, an application layer manager 640, a protocol layer manager 650, and an image capture device layer manager 660, each interconnected by a data/control bus 690.

The image capture device 100 is connected to the input/output interface 610 using a link 102. Similarly, an image data sink 110 can be connected to the input/output interface 610 using a link 112. The links 102 and 112 can each be any known or later developed device or system for connecting the image capture device 100 and the image data sink 110, respectively, to the image capture device control system 600, including a direct cable connection, a connection over a wide area network or a local area network, a connection over an intranet, a connection over an extranet, a connection over the Internet, or a connection over any other distributed processing network or system. In general, the links 102 and 112 can each be any known or later developed connection system or structure usable to respectively connect the image capture device 100 and the image data sink 110 to the image capture device control system 600. It should also be appreciated that the links 102 and 112 can be wired or wireless links that use portions of the public switch telephone network and/or portions of a cellular communication network.

It should also be appreciated that, in general, the image data sink 110 can be any device that is capable of outputting or storing electronic images generated using the image capture device control system 600 using the systems, methods and graphical user interfaces according to this invention, such as a printer, a copier, any other image forming device, a facsimile device, a display device, a storage device, or the like.

While FIG. 5 shows the image capture device 100, the image capture device control system 600 and the image data sink 110 as separate devices, the image capture device control system 600 may be integrated with either or both of the image capture device 100 and/or the image data sink 110, such as, for example, in a digital copier. With such a configuration, for example, the image capture device 100, the image data sink 110 and the image capture device control system 600 may be contained within a single device.

The input device or devices 670 can include any one or more of a mouse, a keyboard, a touch pad, a track ball, a touch screen, or the like, or any other known or later developed device that is capable of inputting data and control signals over the link 672 to the input/output interface 610. Similarly, the display device 680 can be any known or later developed display device, including a cathode ray tube type monitor, a flat screen type monitor, an LCD monitor, or any other known or later developed device on which the graphical user interfaces according to this invention can be displayed and interacted with using one or more of the input devices 670. The display device 680 is provided with control and/or data signals from the input/output interface 610 over the link 682.

Like the signal lines 102 and 112, the links 672 and 682 can be any known or later developed device or system for connecting the input devices 670 and the display device 680, respectively, to the image capture device control system 600, including a direct cable connection, a connection over a wide area network or local area network, a connection over a intranet, a connection over an extranet, a connection over the Internet, a connection over the public switched telephone network, a connection over a cellular network, or a connection over any other distributed processing or communications network or system, including both or either wired and wireless systems. In general, the links 672 and 682 can each be any known or later developed connection system or structure usable to connect the input devices 670 and the display device 680, respectively, to the image capture device control system 600.

The memory 630 includes an application portion 631 in which an application program and any application files used by that application program can be stored. Similarly, the captured image buffer 632 is used to store the captured image data input from the image capture device 110 over the signal line 102 and through the input/output interface 610. In general, the captured electronic image data will be stored in the captured image buffer 632 under control of the controller 620, the image capture device layer manager 660, the protocol layer manager 650 and/or the application layer manager 640.

The image capture profiles portion 633 stores the image capture profiles, as set forth in the incorporated 269 application, as well as job tickets 300, and the like. The image capture parameters portion 634 stores a current set of the image capture parameters to be used by the image capture device 100 when capturing an image. The image capture interface portion 635 stores the various graphical user interfaces shown in FIGS. 3, 4, and 6 and as described above and in detail below.

The application layer manager 640 manages the application layer 240, and in particular, the application portions 242 of any executing applications 260.

The protocol layer manager 650 manages the protocol layer 230, including the source manager 234. The protocol layer manager 650 communications with the application layer manager 640 using the TWAIN™ application programming interfaces 236 of the executing applications 260.

The image capture device layer manager 660 manages each of the TWAIN™ drivers (or data sources) 250 that may be implemented for different ones of the image capture devices 100 that may be accessible by the image capture device control system 600 over various ones of the links 102. In particular, the image capture device layer manager 660 communicates with the protocol layer manager 650 using the acquisition layer application programming interface 232 of the particular TWAIN™ driver (or data source) 250. Similarly, the image capture device layer manager 660 communicates with the image capture device 100 through the input/output interface 610 and over the link 102 using the device interface portion 212.

The image capture device layer manager 660 causes various ones of the image capture graphical user interfaces, such as the graphical user interface 400 shown in FIG. 3, to be displayed on the display device 680. The user can then change and/or input the various image capture parameters. The various image capture parameters can be input through the various graphical user interfaces that the image capture device layer manager 660 displays on the display device 680. Then, after the user saves the various image capture parameters or initiates the corresponding image capture device, the image capture device layer manager 660 stores the selected image capture parameters in the image capture parameters portion 634. The image capture device layer manager 660 then outputs the selected image capture parameters through the input/output interface 610 and over the link 102 to the image capture device 100. The image capture device 100 then uses the various image capture parameters received from the image capture device control system 600 when capturing electronic image data from an original document and when supplying that capture electronic image data over the link 110 to the image capture device control system 600.

Figure 6:
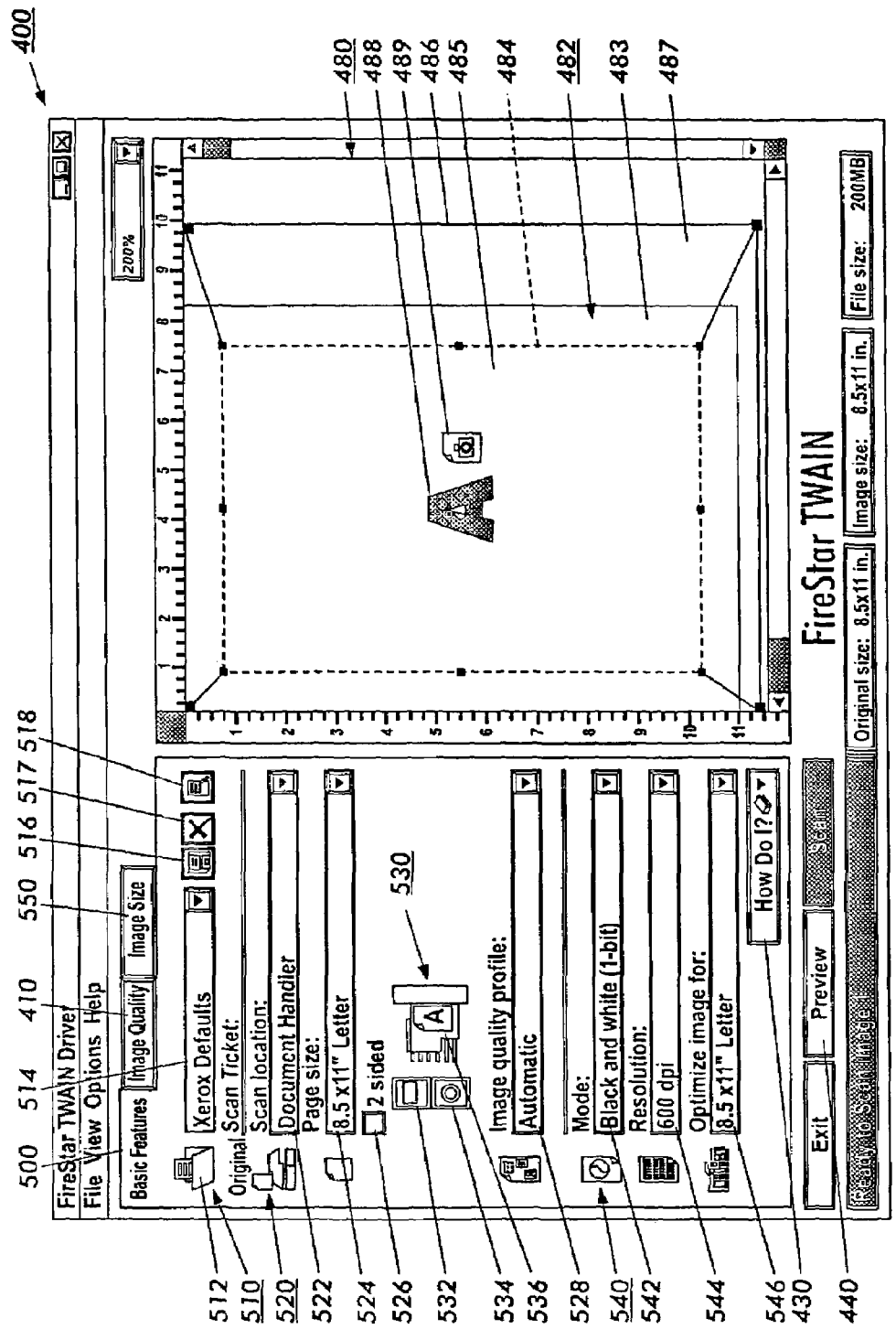
FIG. 6 is a graphical user interface incorporating the scan preview pane portion and visual cues according to this invention.

FIG. 6 shows one exemplary embodiment of the graphical user interface 400 displaying preview mimic 482 in a preview pane portion 480 of the graphical user interface 400. As shown in FIG. 6, the graphical user interface 400 includes the image quality tab 410 and the image size tab 550 in addition to the basic features tab 500. The basic features tab 500 includes a scan ticket portion 510, an original document parameters portion 520, and an image capture parameters portion 540. The basic features tab 500 also includes an instance of a "How Do I" button 430. The "How Do I" button 430 is usable to access an operating instructions help function, which is disclosed in greater detail in the incorporated 266 application.

In particular, the scan ticket portion 510 includes a status icon 512, that indicates the saved status of the scan ticket indicated in a scan ticket dialogue box 514. The current image capture parameters input into each of the basic features tab 500, the image quality tab 410 and the image size tab 550 can be saved to the scan ticket named in the scan ticket dialogue box 514 by selecting the save scan ticket button 516. In contrast, the named scan ticket displayed in the scan ticket dialogue box 514 can be deleted by selecting the delete scan ticket button 517. The show scan ticket button 518 allows the user to quickly view all of the currently loaded scan settings in a text list. This allows the user to view the information on every setting without having to navigate all of the various dialogues in the various portions of the graphical user interface 400.

The original document parameters portion 520 of the basic features tab 500 includes a scan location list box 522, a page size list box 524, a double-sided check box 526, and an image quality profile list box 528. The original document parameters portion 520 also includes a document orientation portion 530 that allows the user to specify how the document will be oriented on the platen 120 of the image capture device 100. The document orientation portion 530 is described in greater detail in the incorporated 272 application.

In particular, the document orientation portion 530 includes a short edge first/long edge first (SEF/LEF) toggle button 532, a rotate button 534 and an input document mimic portion 536. The SEF/LEF toggle button 532 allows the user to indicate whether the first edge of the original document to be introduced into the document handler 130 of the image capture device 100 is the long edge, i.e., the 11 inch edge of standard 8½×11 inch paper, or the short edge, i.e., 8½ edge of standard 8½×11 inch paper. In particular, the user will be expected to feed the original document into the document handler 130 or place it on the platen 110 in the same orientation as specified in the graphic displayed on the SEF/LEF toggle button.

The rotate button 534 allows the user to specify the orientation of the image on the input document. That is, the user may be providing the original document to the document handler using the long edge first orientation while the image has been placed onto that original document in a landscape orientation. In this case, by activating the rotate button 534, the image orientation of the captured image will be rotated 90° clockwise.

The input document mimic portion 536 is a graphic that assists the operator in putting the document into the scanner correctly to receive the desired output. That is, the input document mimic portion 536 can be used by the user to precisely identify to the image capture device the paper size and feed direction of the original document to be scanned as well as the image orientation, so that the captured images will be returned to the calling application in the desired orientation.

The image quality profile list box 528 allows the user to select an image quality profile. As indicated in the incorporated 269 application, each image quality profile is a collection of all the settings on the image quality tab and the various dialogue boxes and other graphical user interface widgets that are accessed through the image quality tab. In particular, the image quality profile list box 528 will include the same image quality profiles as will be provided on the image quality tab. When an image quality profile is selected using the image quality profile list box 528, the image quality profile parameters displayed in the various portions of the image quality tab will be change accordingly.

The image capture parameters portion 540 of the basic feature tab 500 includes a mode list box 542, a resolution list box 544, and an optimize image list box 546. The mode list box 542 allows the user to select the output mode of the image capture device 100. It should be appreciated that the particular modes displayed when the mode list box 542 is selected will depend on the particular image capture device identified in the scan location list box 522 and the particular modes available with that particular image capture device. The possible modes, include, but are not limited to, 1-bit or black/white captured images, 8-bit or grayscale captured images, or various types of 24-bit captured images, including red/green/blue (RGB) color, standard red/green/blue (sRGB) color and Luminance/Blue Chromaticity/Red Chromaticity (YCbCr) color.

The resolution list box 544 allows the user to select the output resolution of the captured image, in dots per inch (dpi). The optimize image list box 546 allows the user to select the output device for which the various captured image quality parameters on the image quality tab 410 should be set to so that the captured image, when printed on the selected output device, will provide the highest quality output image. In particular, in one exemplary embodiment, when a printer is selected in the optimize image list box 546, the tone reproduction curve (TRC) for the 1-bit (black/white) mode is selected as the tone reproduction curve for the indicated printer.

Figure 7:
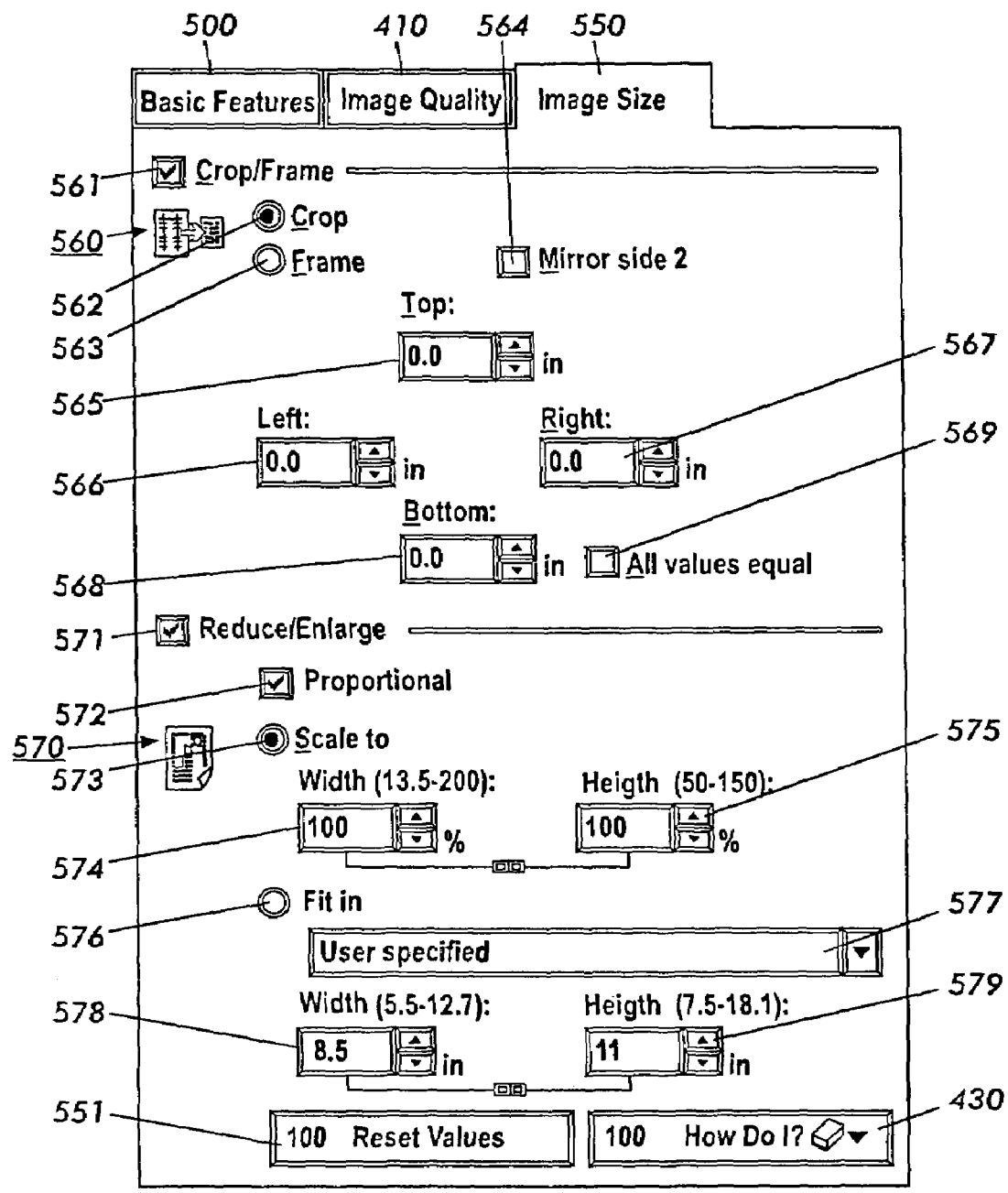
FIG. 7 shows in greater detail one exemplary embodiment of the image size tab of the graphical user interface shown in FIG. 6.

FIG. 7 shows the image size tab 550 in greater detail. As shown in FIG. 7, the image size tab 550 includes a reset values button 551, a crop/frame portion 560 and a reduce/enlarge portion 570. When the reset values button 551 is pressed, the various image capture parameters set forth in the crop/frame portion 560 and the reduce/enlarge portion 570 are reset to the selected default values. Additionally, the image size tab 550 like the basic features tab 500, the image size tab 550 also includes an instance of the "How Do I" button 430.

The crop/frame portion 560 of the image size tab 550 includes a crop/frame checkbox 561, a crop radio button 562, a frame radio button 563, a mirror checkbox 564, and a set of top, left, right, and bottom parameter entry boxes 565–568 that define the location of the rectangle to be cropped out of the capture electronic image data. Finally, the crop/frame portion 560 includes an all values equal checkbox 569.

In particular, the crop/frame checkbox 561 enables or disables all of the crop/frame feature parameters. When checked, the crop/frame checkbox 561 enables all of the crop/frame controls 562–569. Additionally, when checked, the crop/frame checkbox 561 generates a crop/frame marquee selection control 484 in a preview portion 480 of the graphical user interface 400. The crop/frame marquee selection control 484 is discussed in greater detail below. The crop/frame checkbox 561 also allows the user to easily turn on or off the selected crop values on a scan-by-scan basis, without having to reset or clear the values entered into each of the crop/frame control portions 562–569.

The top, left, right and bottom parameter boxes 565–568 allow the user to define a rectangular selection area of the original document that will be cropped or framed. The top, left, right and bottom parameter boxes 565–568 allow the user to specify the distances between the corresponding margin of the original document, based on the size of the original document selected in the page size list 524, and the corresponding edge of the rectangular selection area. The "all values are equal" check box 569, when checked, locks all four of the parameters 565–568 together.

The crop radio button 562, when selected, indicates that the portions of the scanned electronic image data outside of the rectangular selection area defined by the values in the dimension parameter boxes 565–568 should be deleted. Thus, the captured image, before any scaling, is limited to the size of the area within the defined rectangular selection area. In contrast, when the frame radio button 563 is selected, the area outside of the rectangular selection area is given a default color. In general, this default color will be white. In contrast to the captured image after cropping, the captured image size remains the same as the page size of the original document selected in the page size text box 524 shown in FIG. 6.

The mirror check box 564 is enabled only when the two-sided check box 526 of the basic features tab 550 is checked. When enabled and checked, the mirror check box 564 mirrors the dimensions in the top, left, right and bottom dimension parameter boxes 565–568 onto the second side of the page. In particular, the dimensions will be mirrored depending on how the user has defined the orientation of the second side relative to the first side, i.e., head-to-head or head-to-toe.

The reduce/enlarge portion 570 of the image size tab 550 includes a reduce/enlarge check box 571, a proportional check box 572, and a scale-to radio button 573 and associated width and height scale factor parameter boxes 574 and 575. The reduce/enlarge portion 570 also includes a fit-in radio button 576, a fit-in selection text box 577 and associated width and height dimension boxes 578 and 579.

The reduce/enlarge check box 571, when checked, enables all of the reduce/enlarge control elements 572–579. Additionally, when checked, the reduced/enlarged check box 571 enables a scale marquee selection control 486 of the preview pane portion 480 that allows the user to interactively specify the scaling factors. The scale marquee selection control 486 will be discussed in greater detail below.

The proportional check box 572, when checked, links together the width and height scale factor parameter boxes 574 and 575, and the width and height dimension boxes 578 and 579, so that the aspect ratio of the captured image remains constant to the original document. This prevents distortion.

The scale-to radio button 573, when selected, enables the scale factor parameter boxes 574 and 575 to be used to select the desired scaling factors. In contrast, the fit-in radio button 576, when selected, enables the fit-in selection text box 577 and the dimension parameters boxes 578 and 579 to allow the user to specify the absolute dimensions, rather than the reduction/magnification proportions, to be used to scale the captured image relative to the original image. In particular, the fit-in selection text box 577 allows the user to quickly select a particular one of a set of predetermined dimensions to be used to scale the captured image. The fit-in selection text box 577 is described in greater detail in the incorporated 273 application. In contrast, the dimension parameter boxes 578 and 579 allow the user to use any desired set of dimensions.

As indicated above, the graphical user interface 400 also includes the preview pane portion 480. It should be appreciated that the preview pane portion 480 is displayed independent of the most recently selected tab 500, 410 or 550. Rather, in various exemplary embodiments, the preview pane portion 480 is automatically displayed when either, or both, of the crop/frame check box 561 or the reduce/enlarge check box 571 is checked. In other various exemplary embodiments, the preview pane portion 480 is displayed or hidden by selecting or unselecting a "Show Preview" menu item of the View menu. In these exemplary embodiments, the preview pane portion 480 can also be displayed by selecting the preview button 440 to generate a preview scan.

In a first exemplary embodiment of the systems, methods and graphical user interfaces of this invention, whenever the preview pane portion 480 is opened, a preview mimic 482 will be displayed in the preview pane portion 480. The preview mimic 482 provides visual cues to the user to allow the user to determine if the various image capture parameters the user has entered through the basic features tab 500, the image quality tab 410 and/or the image size tab 550 will result in a scanned image that accurately corresponds to the users desired scanned image. In particular, the dimensions of the selected page size, selected by using the page size list box 524, are represented by the page size mimic portion 483.

Similarly, if the crop/frame check box 471 is checked, thus enabling the crop/frame control parameters, the crop/frame marquee 484 will be displayed in the preview pane portion 480. In particular, the crop/frame marquee 484 will indicate the various values entered in the top, left, right and bottom parameter boxes 465–468. Then, by selecting the crop/frame marquee 484, the user can move the top, left, right and/or bottom edges of the rectangular crop/frame selection area 485 to change the desired dimensions of the rectangular crop/frame selection area 485.

Similarly, if the reduce/enlarge check box 571 is checked, thus enabling the reduce/enlarge control parameters 572–579, a scale marquee 486 is displayed. The scale marquee 486 indicates the resulting dimensions after scaling the captured image based on the values entered into the enabled scale factor parameter boxes 574 and 575 or the enabled dimension parameter boxes 578 and 579. Moreover, as indicated in FIG. 6, the dimensions of the scale marquee 486 can be tied to the dimensions of the crop/frame marquee 484 if, for example, the scale-to radio button 573 has been selected. That is, the scale-to function scales the rectangular crop/frame selection area 485, if the crop radio button 562 is selected, or the page size of the original document of the frame radio button 563 is selected, as indicated by the page mimic 483. Thus, changing either the dimensions of the rectangular crop/frame selection area 485, such as, for example, by selecting and manipulating the crop/frame marquee 484, the dimensions of the scale marquee 486 will change proportionally. This is shown in FIG. 6, by the portions of the scale marquee 486 that extend and connect to the crop/frame marquee 484.

In contrast, if the frame radio button 563 and the scale-to radio button 573 were both selected, the connecting portions of the scale marquee 486 would instead extend to the corners of the page mimic 483. In further contrast, if the fit-to radio button 576 were selected, the scale marquee 486 has fixed dimensions. In this case, the scale marquee 486 is not connected to, nor is it re-scaled by, manipulations to either the crop/frame marquee 484 or the page mimic 483.

The preview mimic 482 also includes an image orientation mimic 488 that indicates the image orientation that will result based on the selected parameters for the SEF/LEF original document orientation button 532, the rotate button 534 and the orientation mimic 536. In addition, if the two-sided check box 526 has been selected, the image orientation mimic 488 will also indicate whether the front or back side of the original document is being imaged. Additionally, if the image orientation mimic 488 vindicates the back side of the original document is being previewed, the orientation of the image orientation mimic 488 will depend on whether the head-to-head or the head-to-toe relationship has been defined between the front and back side images on the original document. Finally, the preview mimic 482 includes an image quality profile mimic 489. The image quality profile mimic 489 indicates the particular image quality profile selected in the image quality profile list box 528. For example, in the graphical user interface 400 shown in FIG. 6, the image quality profile mimic 489 indicates that a "photo" image quality profile has been selected.

Thus, the preview mimic 482 allows the user to quickly and visually verify that the various image capture parameters that the user has input to the basic features tab 500, the image quality tab 410, and/or the image size tab 550 will result in the captured image desired by the user. In addition, the page size mimic 483, the crop/frame marquee 484 and/or the scale marquee 486 allow the user to visually adjust the selected image capture parameters so that the adjusted image capture parameters will result in a captured image that more closely corresponds to the desired captured image. Accordingly, the user can avoid the need to view a preview scan in most cases.

Furthermore, in situations where the user still believes a preview scan is desirable, by using the various elements of the preview mimic 482, the preview scan will more closely correspond to the desired production scan. In this way, because only fine adjustments to the image capture parameters should be necessary in view of the preview scan, the user can avoid needing to view additional preview scans before the user decides that the current image capture parameters will result in the desired captured image.

Figure 8A:
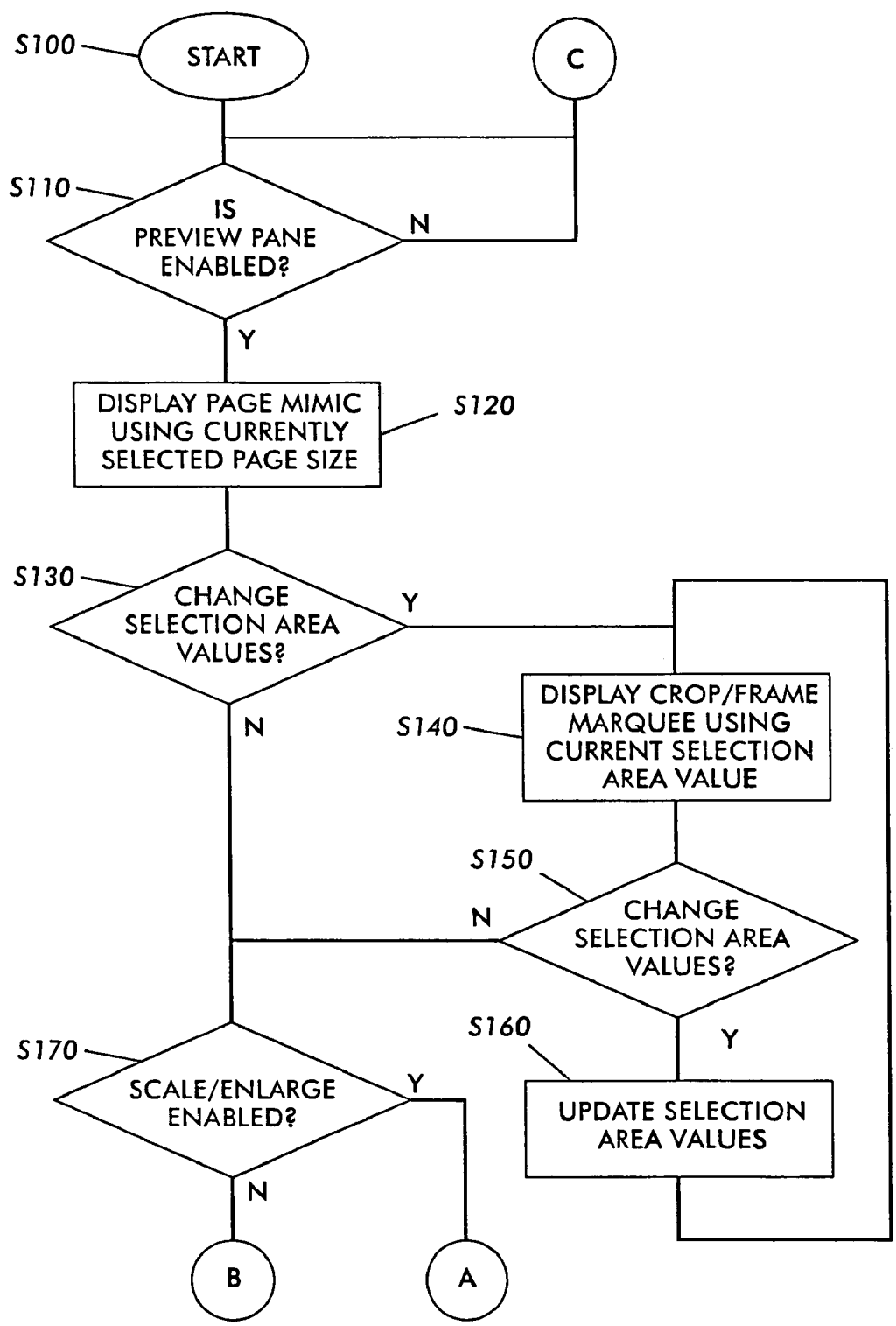
FIGS. 8A–8C are a flowchart outlining one exemplary embodiment of a method for generating and displaying a preview pane portion having visual cues regarding the image capture parameters according to this invention.
Figure 8B:
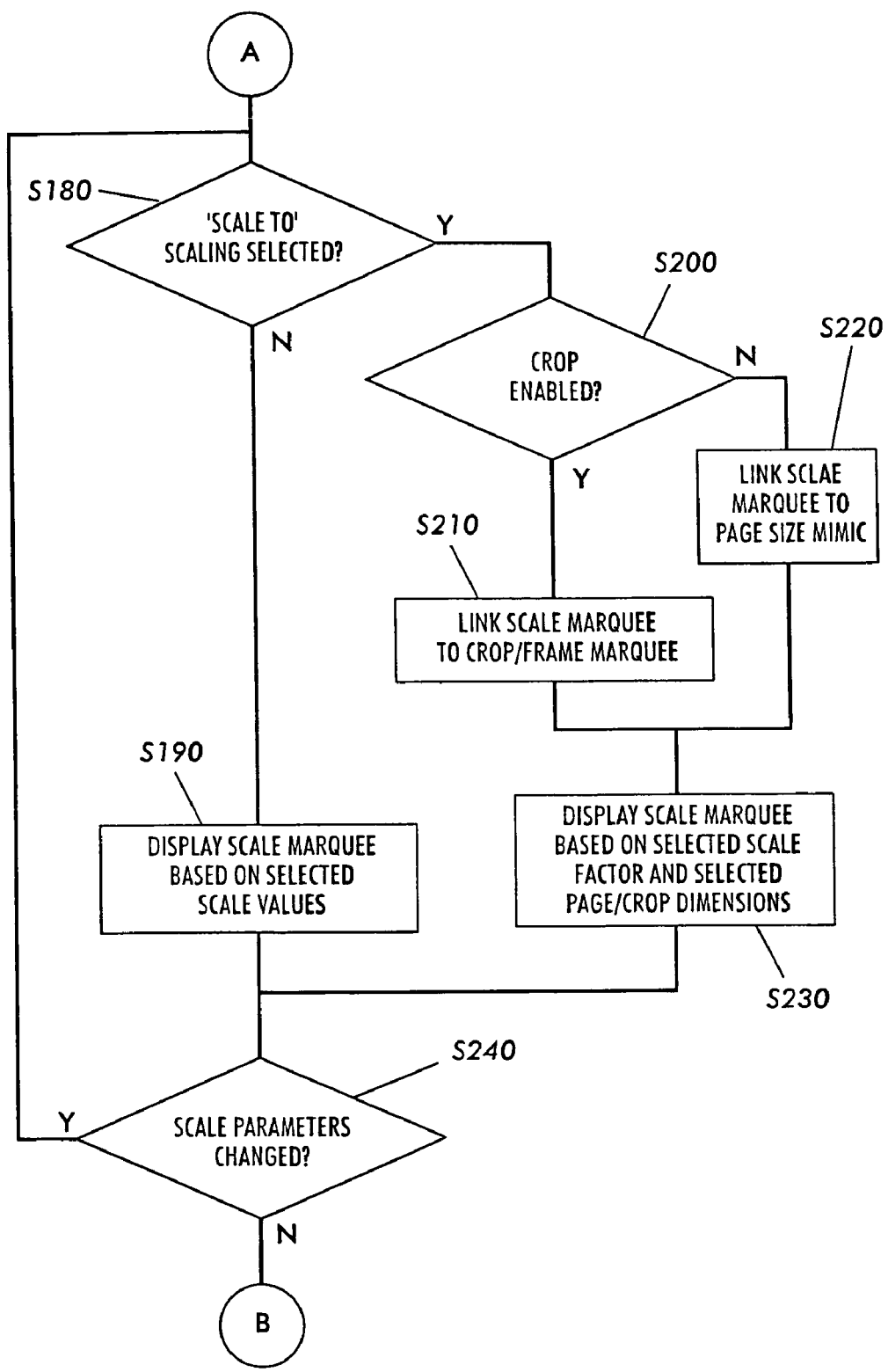
Figure 8C:
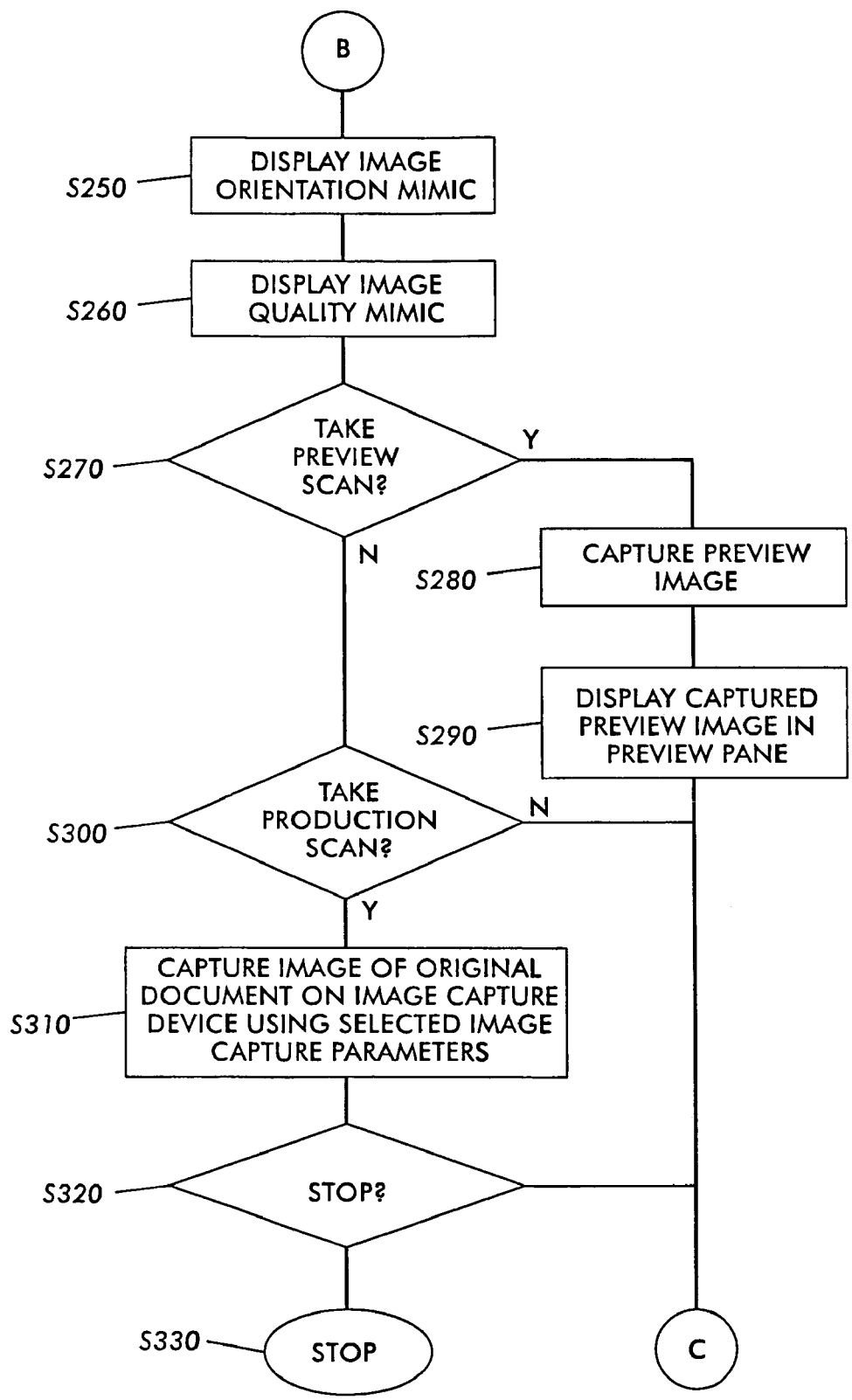

FIGS. 8A–8C are a flowchart outlining one exemplary embodiment of a method for generating and displaying a page mimic in a preview pane portion. It should be understood that the flowchart outlined in FIG. 8A can be initiated in a variety of ways. For example, as indicated above, the page mimic generating and displaying method illustrated in FIGS. 8A–8C can occur only upon the user consciously selecting that the page mimic be displayed. In other exemplary embodiments, as outlined above, the exemplary embodiment of the method for generating and displaying the page mimic shown in FIGS. 8A–8C can be automatically invoked in view of the selection of various graphical user interface widgets on the basic features tab 500 and/or the image size tab 550.

In any case, beginning in step S100, control continues to step S110, where a determination is made whether the preview pane portion is enabled and displayed. If not, control jumps back to step S110 until the preview pane portion is enabled and displayed. Otherwise, once the preview pane portion is enabled and displayed, control continues step S120.

In step S120, the page mimic is displayed using the currently selected page size. In particular, if the user has not consciously changed the currently selected page size, the currently selected page size will be a default page size. Next, in step S130, a determination is made whether the crop/frame check box has been enabled. If so, control continues to step S140. Otherwise, control jumps to step S170.

In step S140, the crop/frame marquee is displayed using the currently selected rectangular selection area values. Then, in step S150, a determination is made whether any one or more of the rectangular selection area values have been changed. If not, control jumps directly to step S170. Otherwise, control continues to step S160.

In step S160, the current selection area values are updated. Control then jumps back to step S140. In particular, the selection area values can be updated in step S160 in two ways. First, the user can enter a new selection area values into the image size tab. In this case, updating the selection area values comprising forwarding the new selection area values so that the crop/frame marquee can be re-displayed in step S140 using the new current selection area values. Alternatively, the selection area values can be updated in step S160 by selecting and manipulating the crop/frame marquee. In this case, the selection area values resulting after the crop/frame marquee has been manipulated are determined and displayed in the appropriate portions of the image size tab.

In step S170, a determination is made whether the scale/enlarge check box has been enabled. If so, control continues to step S180. Otherwise, control jumps to step S250.

In step S180, a determination is made whether the "scale-to" scaling function has been enabled. If not, control continues to step S190. Otherwise, control continues to step S200. In step S190, because the "fit-to" scaling function was selected, the scale marquee is displayed based on the selected values in the "fit-to" scale parameter boxes. Control then jumps to step S240.

In contrast, in step S200, a determination is made whether the crop function has been enabled. If so, control continues to step S210. Otherwise, either the frame function has been enabled, or neither crop function nor the frame function has been enabled. In either case, control jumps to step S220.

In step S210, the scale marquee is linked to the crop/frame marquee. Control then jumps directly to step S230. In contrast, in step S220, the scale marquee is linked to the page size mimic. Next, in step S230, the scale marquee is displayed based on the selected scale factor and either the selected dimensions of the page size or the selected dimensions for the crop selection area. Then, in step S240, a determination is made whether the scale parameters have been changed by the user. If so, control jumps back to step S180. Otherwise, control continues to step S250.

In step S250, the image orientation mimic is displayed based on the selected page orientation and image orientation on the page, including whether the two-sided check box has been checked, and, if so, which one of the head-to-head or head-to-toe radio buttons have been selected. Then, in step S260, the image quality profile mimic is displayed based on the selected image quality profile. Next, in step S270, a determination is made whether the user has selected to take a preview scan. If so, control continues to step S280. Otherwise, control jumps to step S300.

In step S280, a preview image is captured. Next, in step S290, the captured preview image is displayed in the preview pane portion. Control then jumps back to step S110, where a determination is made whether the preview image should be removed from the previewed pane and an new set of scanning parameter visual cues should be displayed.

In contrast, in step S300, a determination is made whether the user has requested that a production image be captured. If not, control again jumps back to step S110. Otherwise, control continues to step S310. In step S310, an image of the original document on the image capture device is captured using the selected image capture parameters, especially those using the visual cues according to this invention. Next, in step S320, a determination is made whether to stop. If not, control once again jumps back to step S110. Otherwise, if the user does wish to exit the preview process, control continues to step S330, where the method ends.

It should be appreciated that the image capture device control systems 200 and 600 shown in FIGS. 2 and 5 can each be implemented on a general purpose computer. However, it should also be appreciated that the image capture device control systems 200 and 600 can also each be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing the flowchart shown in FIGS. 8A–8C, can be used to implement either of the image capture device control systems 200 or 600.

The memory 630 shown in FIG. 5 can include both volatile and/or non-volatile alterable memory or non-alterable memory. Any alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Thus, it should be understood that each of the elements of the image capture device control systems 200 and 600 shown in FIGS. 2 and 5 can be implemented as portions of a suitably programmed general purpose computer. Alternatively, each of the elements shown in FIG. 2 or 5 can be implemented as physically distinct hardware circuits within a ASIC, or using a FPGA, a PLD, a PLA, or a PAL, or using discreet logic elements or discreet circuit elements. The particular form each of the elements of the image capture device control systems 200 or 600 shown in FIGS. 2 and 5 will take as a design choice and will be obvious and predictable to those skilled in the art.

Moreover, the image capture device control systems 200 or 600 can each be implemented as software executing on a programmed general purpose computer, a special purpose computer, a microprocessor or the like. In this case, the image capture device control systems 200 and 600 can be implemented as routines embedded in a peripheral driver, as a resource residing on a server, or the like.

The image capture device control systems 200 and 600 can each also be implemented by physically incorporating them into a software and/or hardware system, such as the hardware and software systems of a digital copier or the like.

While this invention has been described in conjunction with the exemplary embodiments outlined above, it is evident that many alternatives and modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An image capture control system for an image capture device, comprising:
   a controller that provides control parameters to the image capture device, the image capture device able to capture an image, from an original document that provides an original image, based on the provided control parameters, the control parameters including at least one image capture parameter;
   a display device; and
   a graphical user interface displayable on the display device, the graphical user interface including a preview pane portion that visually indicates features of a resulting captured image, the features including a scan ticket portion, wherein
      the resulting captured image will result upon generating a captured image from the original image using the at least one image capture parameter, and
      the preview pane portion visually indicates the features in response to a user selection and without the image capture device capturing the captured image.

2. The image capture control system of claim 1, wherein the preview pane portion further comprises a crop/frame marquee selection control that visually indicates a portion of the original image that will be captured as the captured image.

3. The image capture control system of claim 2, wherein the portion of the original image indicated by the crop/frame marquee selection control is a cropped portion of the original image.

4. The image capture control system of claim 2, wherein the portion of the original image indicated by the crop/frame marquee selection control is a framed portion of the original image.

5. The image capture control system of claim 2, wherein the graphical user interface further includes:
   a selection portion that is usable to define dimensions of a selected portion of the original image; and
   a selection enable portion that enables the selection portion; and
   dimensions of the crop/frame marquee selection control are determined based on the dimensions defined in the selection portion.

6. The image capture control system of claim 5, wherein the graphical user interface further includes:
   a selection portion that is usable to define dimensions of a selected portion of the original image; and
   a selection enable portion that enables the selection portion;
   dimensions of the crop/frame marquee selection control are alterable; and
   altering the dimensions of the crop/frame marquee selection control causes the dimensions defined in the selection portion to be correspondingly altered.

7. The image capture control system of claim 5, wherein:
the preview pane portion further comprises a scale marquee selection control that visually indicates scaled dimensions of the captured image;
the graphical user interface further includes:
a scale-to portion that is usable to define scale-to parameter factors that define a relationship between dimensions of the captured image and dimensions of a selected portion of the original image; and
a scale-to enable portion that enables the scale-to portion; and
dimensions of the scale marquee selection control are determined based on the dimensions defined in the selection portion and the defined scale-to parameter factor.

8. The image capture control system of claim 7, wherein dimensions of the crop/frame marquee selection control are alterable; and
altering the dimensions of the crop/frame marquee selection control causes the dimensions of the scale marquee selection control to be correspondingly altered.

9. The image capture control system of claim 2, wherein the preview pane portion further comprises a scale marquee selection control that visually indicates scaled dimensions of the captured image.

10. The image capture control system of claim 9, wherein the graphical user interface further includes:
a scale-to portion that is usable to define scale-to parameter factors that define a relationship between dimensions of the captured image and dimensions of a selected portion of the original image; and
a scale-to enable portion that enables the scale-to portion; and
when the scale-to portion is enabled, the scale marquee selection control is linked to the crop/frame marquee selection control.

11. The image capture control system of claim 1, wherein the preview pane portion further comprises a scale marquee selection control that visually indicates scaled dimensions of the captured image.

12. The image capture control system of claim 11, wherein
the graphical user interface further includes:
a fit-to dimensions portion that is usable to define dimensions to which the captured image is to be scaled; and
a fit-to dimensions enable portion that enables the fit-to dimensions; and
dimensions of the scale marquee selection control are determined based on the dimensions defined in the fit-to dimensions portion.

13. The image capture control system of claim 12, wherein
the graphical user interface further includes:
a fit-to dimensions portion that is usable to define dimensions to which the captured image is to be scaled; and
a fit-to dimensions enable portion that enables the fit-to dimensions; and
dimensions of the scale marquee selection control are alterable; and
altering the dimensions of the scale marquee selection control causes the dimensions defined in the fit-to dimensions portion to be correspondingly altered.

14. The image capture control system of claim 1, wherein the preview pane portion further comprises an image orientation mimic that visually indicates an orientation of the captured image relative to the original image.

15. The image capture control system of claim 1, wherein the preview pane portion further comprises an image quality profile mimic that visually indicates a currently selected image quality profile to be used when generating the captured image from the original image.

16. The image capture control system of claim 1, wherein the scan ticket parameter portion indicates a save status of a scan ticket, the scan ticket including a plurality of scan settings, and the preview pane portion further comprises at least one of:
a crop/frame marquee selection control;
a scale marquee selection control;
an image orientation mimic; and
an image quality profile mimic.

17. The image capture control system of claim 1, wherein the preview pane portion visually indicates, in addition to the scan ticket portion, at least one of an original document parameters portion, and an image capture parameters portion that includes the at least one image capture parameter.

18. The image capture control system of claim 1, wherein the preview pane portion visually indicates an original document parameters portion, and an image capture parameters portion that includes the at least one image capture parameter, in addition to the scan ticket portion.

19. A graphical user interface displayable on a display device of an image capture control system for an image capture device, the image capture device able to capture an image, from an original document that provides an original image, based on control parameters, the control parameters including scale parameters, the graphical user interface comprising:
a preview pane portion that visually indicates features of a resulting captured image, the features including a scan ticket portion, wherein
the resulting captured image will result upon generating a captured image from the original image using the at least one image capture parameter, and
the preview pane portion visually indicates the features in response to a user selection and without the image capture device capturing the captured image.

20. The graphical user interface of claim 19, wherein the preview pane portion further comprises a crop/frame marquee selection control that visually indicates a portion of the original image that will be captured as the captured image.

21. The graphical user interface of claim 20, wherein the portion of the original image indicated by the crop/frame marquee selection control is a cropped portion of the original image.

22. The graphical user interface of claim 20, wherein the portion of the original image indicated by the crop/frame marquee selection control is a framed portion of the original image.

23. The graphical user interface of claim 20, wherein
the graphical user interface further includes:
a selection portion that is usable to define dimensions of a selected portion of the original image; and
a selection enable portion that enables the selection portion; and
dimensions of the crop/frame marquee selection control are determined based on the dimensions defined in the selection portion.

24. The graphical user interface of claim 23, wherein
the graphical user interface further includes:
a selection portion that is usable to define dimensions of a selected portion of the original image; and a selection enable portion that enables the selection portion;

dimensions of the crop/frame marquee selection control are alterable; and altering the dimensions of the crop/frame marquee selection control causes the dimensions defined in the selection portion to be correspondingly altered.

25. The graphical user interface of claim 23, wherein:

the preview pane portion further comprises a scale marquee selection control that visually indicates scaled dimensions of the captured image;

the graphical user interface further includes:

a scale-to portion that is usable to define scale-to parameter factors that define a relationship between dimensions of the captured image and dimensions of a selected portion of the original image; and a scale-to enable portion that enables the scale-to portion; and dimensions of the scale marquee selection control are determined based on the dimensions defined in the selection portion and the defined scale-to parameter factor.

26. The graphical user interface of claim 25, wherein dimensions of the crop/frame marquee selection control are alterable; and altering the dimensions of the crop/frame marquee selection control causes the dimensions of the scale marquee selection control to be correspondingly altered.

27. The graphical user interface of claim 20, wherein the preview pane portion further comprises a scale marquee selection control that visually indicates scaled dimensions of the captured image.

28. The graphical user interface of claim 27, wherein the graphical user interface further includes:

a scale-to portion that is usable to define scale-to parameter factors that define a relationship between dimensions of the captured image and dimensions of a selected portion of the original image; and a scale-to enable portion that enables the scale-to portion; and when the scale-to portion is enabled, the scale marquee selection control is linked to the crop/frame marquee selection control.

29. The graphical user interface of claim 19, wherein the preview pane portion further comprises a scale marquee selection control that visually indicates scaled dimensions of the captured image.

30. The graphical user interface of claim 29, wherein the graphical user interface further includes:

a fit-to dimensions portion that is usable to define dimensions to which the captured image is to be scaled; and a fit-to dimensions enable portion that enables the fit-to dimensions; and dimensions of the scale marquee selection control are determined based on the dimensions defined in the fit-to dimensions portion.

31. The graphical user interface of claim 30, wherein the graphical user interface further includes:

a fit-to dimensions portion that is usable to define dimensions to which the captured image is to be scaled; and a fit-to dimensions enable portion that enables the fit-to dimensions; and dimensions of the scale marquee selection control are alterable; and altering the dimensions of the scale marquee selection control causes the dimensions defined in the fit-to dimensions portion to be correspondingly altered.

32. The graphical user interface of claim 19, wherein the preview pane portion further comprises an image orientation mimic that visually indicates an orientation of the captured image relative to the original image.

33. The graphical user interface of claim 19, wherein the preview pane portion further comprises an image quality profile mimic that visually indicates a currently selected image quality profile to be used when generating the captured image from the original image.

34. The graphical user interface of claim 19, wherein the scan ticket parameter portion indicates a save status of a scan ticket, the scan ticket including a plurality of scan settings, and the preview pane portion further comprises at least one of:

a crop/frame marquee selection control;

a scale marquee selection control;

an image orientation mimic; and an image quality profile mimic.

35. The graphical user interface of claim 19, wherein the preview pane portion visually indicates in addition to the scan ticket portion at least one of an original document parameters portion, and an image capture parameters portion that includes the at least one image capture parameter.

36. The graphical user interface of claim 19, wherein the preview pane portion visually indicates an original document parameters portion, and an image capture parameters portion that includes the at least one image capture parameter, in addition to the scan ticket portion.

37. A method for displaying visual cues indicating capture parameters for a captured image without generating the captured image from an original document that provides an original image, comprising:

displaying a preview pane that includes features including a scan ticket portion that indicates a save status of a scan ticket, the scan ticket including a plurality of scan settings; and displaying the features in response to a user selection within the preview pane, without the image capture device capturing the captured image, an image quality profile mimic, and at least one of:

a crop/frame marquee selection control;

a scale marquee selection control; and an image orientation mimic.

38. The method of claim 37, wherein displaying within the preview pane the crop/frame marquee selection control comprises:

defining dimensions of a selected portion of the original image;

determining dimensions of the crop/frame marquee selection control based on the defined dimensions of the selection portion; and displaying the crop/frame marquee selection control with the determined dimensions.

39. The method of claim 38, wherein displaying within the preview pane the crop/frame marquee selection control further comprises:

selecting the crop/frame marquee selection control;

altering the displayed dimensions of the crop/frame marquee selection control; and correspondingly altering the defined dimensions of the selected portion of the original image.

40. The method of claim 38, wherein displaying within the preview pane the scale marquee selection control comprises:

defining a relationship between dimensions for the captured image and the determined dimensions of the crop/frame marquee selection control; and displaying the scale marquee selection control based on the determined relationship and current determined dimensions of the crop/frame marquee selection control.

41. The method of claim 40, further comprising:

selecting the crop/frame marquee selection control;

altering the displayed dimensions of the crop/frame marquee selection control; and correspondingly altering the dimensions of the scale marquee selection control.

42. The method of claim 37, wherein displaying within the preview pane the scale marquee selection control comprises:

defining dimensions to which the captured image is to be scaled;

determining dimensions of the scale marquee selection control based on the defined dimensions to which the captured image is to be scaled; and displaying the scale marquee selection control with the determined dimensions.

43. The method of claim 42, further comprising:

selecting the scale marquee selection control;

altering the displayed dimensions of the scale marquee selection control; and correspondingly altering the defined dimensions to which the captured image is to be scaled.

44. The method of claim 37, wherein displaying the preview pane further includes displaying at least one of an original document parameter portion and an image capture parameter portion.

45. The method of claim 37, wherein displaying the preview pane further includes displaying an original document parameter portion and an image capture parameter portion.

* * * * *